United States Patent
Chouings

[15] 3,658,390
[45] Apr. 25, 1972

[54] ANTI-LOCK MEANS FOR FLUID PRESSURE OPERATED BRAKING SYSTEMS

[72] Inventor: Leslie C. Chouings, Leamington Spa, England

[73] Assignee: Automotive Products Company Limited, Leamington Spa, England

[22] Filed: June 13, 1969

[21] Appl. No.: 833,086

[30] Foreign Application Priority Data

June 25, 1968   Great Britain ..................... 30,117/68

[52] U.S. Cl. ........................ 303/21 A, 188/181 A, 303/22 R
[51] Int. Cl. .......................................... B60t 8/16, B60t 8/18
[58] Field of Search ...................... 303/21, 22, 6, 24, 61–63, 303/68–69; 188/181

[56] References Cited

UNITED STATES PATENTS

| | | | |
|---|---|---|---|
| 3,099,499 | 7/1963 | Parshall | 303/21 F |
| 3,479,094 | 11/1969 | Chouings | 303/21 A X |
| 3,527,504 | 9/1970 | Chouings et al | 303/24 A X |
| 843,481 | 2/1907 | McCook | 303/22 |
| 1,091,596 | 3/1914 | Snyder | 303/22 |
| 2,424,913 | 7/1947 | Browall | 303/22 X |

Primary Examiner—Milton Buchler
Assistant Examiner—John J. McLaughlin
Attorney—Lawrence J. Winter

[57] ABSTRACT

In a compressed air operated braking system including a valve, automatically operated by a skid sensing device to disconnect the brake motor cylinders from the compressed air source and connect them to exhaust when a skid is sensed; and to reconnect the motor cylinders to the said source and disconnect them from exhaust when the tendency to skid ceases, a variable flow restricting device is provided between the compressed air source and the automatic valve and is controlled to vary the degree of flow restriction responsive to changes in a condition, such as vehicle loading, which affects the tendency to skid.

2 Claims, 1 Drawing Figure

PATENTED APR 25 1972 3,658,390
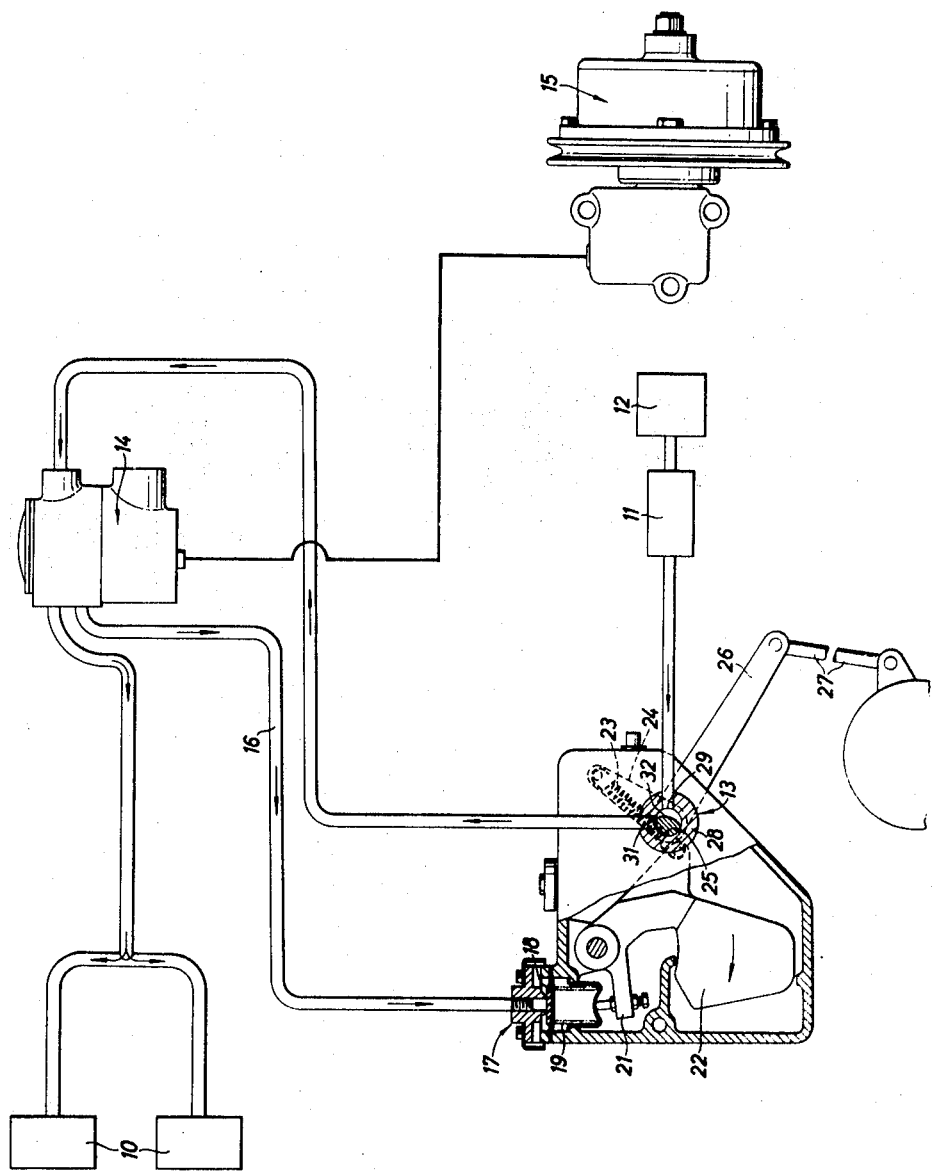
INVENTOR
Leslie C. Chouings
BY Lawrence & Winter
ATTORNEY

ANTI-LOCK MEANS FOR FLUID PRESSURE OPERATED BRAKING SYSTEMS

This invention relates to fluid pressure operated braking systems for vehicles including means, commonly referred to an anti-lock means, for reducing automatically the fluid pressure acting to apply the brake or brakes acting on a wheel or wheels of the vehicle when such wheel or wheels tends to skid or to approach conditions in which skidding would take place, so that the retarding effect of the brake or brakes can be reduced to prevent wheel locking.

Braking systems have been proposed in which the brake operating motor cylinders are operated by compressed air, the brakes being applied and released by actuation of an operator-actuated control valve for connecting said motor cylinders to a source of compressed air or to exhaust. It has further been proposed to incorporate in such a system an automatically operated valve, under the control of a skid sensing device, which shuts off the connection of the brake motor cylinders to the source of compressed air when the said sensing device produces a signal indicating that a wheel is approaching skid conditions, and connects the said motor cylinders to exhaust, the connection of the motor cylinders through said automatically operated valve to the source of compressed air being restored when the tendency to skid ceases.

It has been found that it is sometimes desirable to control the flow of air from the air supply source to the automatic valve in relation to some condition, such as vehicle loading, which affects the wheel adhesion, and, according to the present invention, in a fluid pressure braking system as described in the last preceding paragraph, a variable flow restricting device is incorporated in a conduit connecting the source of air pressure to said automatic valve, which flow restricting device is controlled to vary the degree of flow restriction by means responsive to changes in the condition in relation to which the said flow of air is to be controlled.

The variable flow restricting device may be so controlled by changes in the loading of the vehicle as to provide a degree of restriction which varies inversely with the vehicle loading.

An embodiment of the present invention will now be described with reference to the accompanying drawing which shows, diagrammatically, a braking system according to the invention.

Referring to the drawing, motor cylinders 10 in which compressed air acts to apply brakes to the wheels of a vehicle are normally connected to the atmosphere through a driver's control valve 11 but, when braking is required, are connected by operation of the said valve to a source 12 of compressed air.

Between the control valve 11 and the motor cylinders 10 there are provided a variable flow restricting device 13 and an air control valve 14, the air control valve, which normally provides a connection between the control valve 11 and the motor cylinders 10 being operable by a signal from a skid sensing device 15, when conditions likely to led to skidding of the wheels arise, to shut off the connection between the motor cylinders 10 and the control valve 11 and connect the said motor cylinders to an exhaust conduit 16 leading to a relief valve 17 for controlling the rate at which air is exhausted from the motor cylinders 10.

The relief valve 17 is mounted on the sprung mass of the vehicle and comprises a valve closure member 18 urged away from its seat by air pressure in the exhaust conduit 16 and urged towards its seat by a loading spring 19. The loading spring 19 reacts on an arm 21 carried by a suspended weight 22 tending to move to increase the spring loading under inertia forces resulting from deceleration of the vehicle, such movement of the weight 22 being opposed by a tension spring 23 coupled to an arm 24 on a spindle 25 which also carries another arm 26 connected by a link 27 to an axle or wheel mounting of the vehicle, the arrangement being such that, as the vehicle load is increased and the sprung mass moves downwardly due to the deflection of the suspension by the load, the tension in the spring 23 is reduced and less opposition is offered by that spring to the movement of the suspended weight 22 under inertia forces.

The components of the braking system thus far referred to, apart from the variable flow restricting device 13, and the operation of the braking system, are fully described in the Cognate Complete Specification filed in respect of our co-pending applications Nos. 6422/67 and 32343/67 and will not be described in any further detail herein.

The variable flow restriction device 13 comprises a fixed housing in the form of a bush 28 in which the spindle 25 is rotatable, two radial ports 29 and 31, formed in the bush at right angles one to the other, being connected respectively to the driver's control valve 11 and to the air control valve 14. The spindle 25 is formed with a part-circumferential groove 32 adapted to connect the ports 29 and 31 one to the other. The angular position of the groove 32 in the spindle 25 is such that, when the vehicle is lightly loaded, one of the ports, for example the port 31, is partially closed by the surface of the spindle 25 at one end of the groove 32, increase of the vehicle loading rotating the spindle 25 to increase the area of that port which is exposed to the groove. Thus, when the vehicle is lightly loaded, the restoration of full braking pressure after the brakes have been released due to a tendency of the wheels to skid, is delayed, due to the restriction of flow of compressed air into the motor cylinders, to a greater extent than when the vehicle is heavily loaded. The risk of skidding being caused by too rapid re-application of the brakes when the vehicle is lightly loaded is therefore reduced without delaying the re-application of the brakes to the same extent when the vehicle is more heavily loaded and better road adhesion exists due to the heavier load.

It will be understood that the above description relates to only one way in which the variable restriction may be provided, and that the same effect may be provided in other ways. Moreover, the invention may be applied to fluid pressure braking systems, in which air pressure motor cylinders are employed to apply the brakes, other than the system described in our co-pending Cognate Applications above referred to.

The condition in relation to which the variable flow restricting device is controlled may be any condition other than vehicle loading which has an effect on wheel adhesion.

What is claimed is:

1. A fluid pressure braking system for a vehicle comprising brake operating motor cylinders, a source of compressed air in communication with said cylinders for supplying fluid under pressure thereto, a driver control valve operatively connected to said source of fluid pressure and to said motor cylinders to supply fluid pressure thereon, exhaust means in communication with said motor cylinders, an automatic operated control valve disposed between said driver control valve and said motor cylinders and operatively connected to said exhaust means to exhaust fluid pressure from said cylinders to said exhaust means when the wheel of a vehicle approaches skid conditions, a skid sensing device, skid sensing signal means operatively connected to said automatic control valve and skid sensing device and responsive to skid conditions of a wheel of the vehicle to actuate said automatic control valve to connect said fluid pressure in the cylinders with said exhaust means and variable flow restriction means disposed between said driver control valve and automatic control valve, said flow restricting means including a fixed housing in which a spindle is rotatably mounted, a part circumferential groove in the spindle cooperating with angularly spaced ports in the housing so that one of the ports is exposed to the groove to a varying extent depending on the angular position of the spindle, said flow restriction means being in communication with said source of fluid pressure and driver control valve and automatic control valve at all times, and means in said restriction means responsive to load changes in the vehicle, to vary the flow rate therethrough in inverse relation to the vehicle loading.

2. The fluid pressure braking system of claim 1, wherein the housing is mounted on the sprung mass of a vehicle and the spindle carries an arm coupled by linkage to a wheel mounting of the vehicle.

* * * * *